United States Patent [19]

Ghandhi

[11] 4,416,108

[45] Nov. 22, 1983

[54] DEVICE FOR REDUCING EVAPORATION LOSS FROM CARBURETORS AND FUEL TANKS

[75] Inventor: Burzoe K. Ghandhi, Whitefish Bay, Wis.

[73] Assignee: Outboard Marine Corporation, Waukegan, Ill.

[21] Appl. No.: 367,591

[22] Filed: Apr. 12, 1982

[51] Int. Cl.[3] ...................... A01D 35/00; B65D 51/16

[52] U.S. Cl. ...................................... 56/17.5; 220/202; 220/85 VS; 123/516

[58] Field of Search ................. 56/17.5; 123/510, 516, 123/518, 517; 220/85 VS, 85 VR, 85 S, 202

[56] References Cited

U.S. PATENT DOCUMENTS

| | | | |
|---|---|---|---|
| 2,145,739 | 1/1939 | Shaw | 220/85 VS |
| 2,964,029 | 12/1960 | Tirloni | 123/516 |
| 3,302,658 | 2/1967 | De Frees | 123/516 |
| 3,640,257 | 2/1972 | Cornelius | 123/516 |
| 3,687,335 | 8/1972 | Hunter | 220/85 VR |
| 3,771,690 | 11/1973 | Hunter | 123/518 |
| 4,028,075 | 6/1977 | Roberge | 220/202 |
| 4,162,021 | 7/1979 | Crute | 220/202 |
| 4,211,058 | 7/1980 | Larsen | 56/17.5 |
| 4,326,370 | 4/1982 | Thourd | 56/17.5 |

FOREIGN PATENT DOCUMENTS

| | | | |
|---|---|---|---|
| 663927 | 5/1963 | Canada | 123/516 |
| 791109 | 12/1935 | France | 123/516 |
| 702125 | 3/1966 | Italy . | |
| 5519907 | 7/1978 | Japan . | |
| 1431161 | 2/1973 | United Kingdom . | |

*Primary Examiner*—Gene Mancene

*Assistant Examiner*—David I. Tarnoff

*Attorney, Agent, or Firm*—Michael, Best & Friedrich

[57] ABSTRACT

A lawn mower is illustrated as including a carburetor having a float bowl adapted to contain a vent assembly for selectively venting the air space of the carburetor float bowl to the atmosphere when the internal combustion engine of the lawn mower is running and for precluding evaporation of fuel from the air space when the engine is not running. The lawn mower fuel tank also includes a vent assembly for selectively venting the fuel tank to the atmosphere when the internal combustion engine is running and for precluding evaporation of fuel from the fuel tank into the atmosphere when the engine is not running. Each vent assembly includes a valve member resting on a valve seat and supported for movement in response to vibration of the engine and in such a manner that the valve member will return to its position on the valve seat when the engine is shut off.

11 Claims, 4 Drawing Figures

DEVICE FOR REDUCING EVAPORATION LOSS FROM CARBURETORS AND FUEL TANKS

FIELD OF THE INVENTION

The invention relates to engine driven devices where a fuel tank and carburetor are mounted so as to experience engine vibration and more particularly to means for controlling venting of the carburetor float bowl and the fuel tank employed on engine driven devices such as lawn mowers.

BACKGROUND PRIOR ART

Prior art structures related to apparatus for controlling the venting of a fuel tank or fuel conduit or for controlling evaporation of fuel are shown in the U.S. Shaw Pat. No. 2,145,739, issued Jan. 31, 1939; the U.S. Tirloni Pat. No. 2,964,029, issued Dec. 13, 1960; the U.S. Cornelius Pat. No. 3,640,257, issued Feb. 8, 1972, and the U.S. Hunter Pat. No. 3,687,335, issued Aug. 29, 1972.

Attention is also directed to the U.S. Robert Pat. No. 4,028,075, issued June 7, 1977; Italian Pat. No. 702,125; British Pat. No. 1,431,161; German Offenlegungsschrift No. 2,406,843 issued July 1974; and Japanese Pat. No. 55-19907.

SUMMARY OF THE INVENTION

The invention includes a lawn mower having a blade housing, a wheel for supporting the blade housing for movement along the ground, a rotatable cutting blade supported in the blade housing, and an internal combustion engine for rotatably driving the cutting blade. The internal combustion engine includes a carburetor having a float bowl adapted to contain a quantity of liquid fuel and adapted to have a confined air space above the liquid fuel. Means are provided for selectively venting the float bowl to the atmosphere, the means for selectively venting including means for venting the air space to the atmosphere when the internal combustion engine is running and for precluding evaporation of fuel from the float bowl into the atmosphere when the engine is not running.

The invention also includes a lawn mower having a blade housing, a wheel for supporting the blade housing for movement along the round, a rotatable cutting blade supported in the blade housing, and an internal combustion engine for rotatably driving the cutting blade. The internal combustion engine includes a carburetor having a float bowl adapted to contain a quantity of liquid fuel and adapted to have an air space above the liquid fuel. Means are also provided for selectively venting the air space to the atmosphere when the internal combustion engine is running and for precluding evaporation of fuel from the air space into the atmosphere when the engine is not running. The lawn mower also includes a fuel tank adapted to contain liquid fuel, and adapted to have an air space above the liquid fuel, and means for selectively venting the fuel tank to the atmosphere when the internal combustion is running and for precluding evaporation of fuel from the fuel tank into the atmosphere when the engine is not running. A conduit is also provided between the fuel tank and the float bowl for conveying liquid fuel from the fuel tank to the float bowl.

The invention also includes a lawn mower having a blade housing, a wheel for supporting the blade housing for movement along the ground, a rotatable cutting blade supported in the blade housing, an internal combustion engine for rotatably driving the cutting blade, and a fuel tank adapted to contain a quantity of liquid fuel and adapted to have a confined air space above the liquid fuel. The fuel tank includes means for selectively venting the fuel tank to the atmosphere, the means for selectively venting including means for venting the air space to the atmosphere when the internal combustion engine is running and for precluding evaporation of fuel from the fuel tank into the atmosphere when the engine is not running.

The invention also includes an internal combustion engine having a carburetor including a float bowl adapted to contain a quantity of liquid fuel and adapted to have a confined air space above the liquid fuel. Means are also provided for selectively venting the float bowl to the atmosphere, the means for selectively venting including means for venting the air space to the atmosphere when the internal combustion engine is running and for precluding evaporation of fuel from the float bowl into the atmosphere when the engine is not running.

The invention also includes an internal combustion engine having a carburetor including a float bowl adapted to contain a quantity of liquid fuel and adapted to have a confined air space above the liquid fuel. Means are provided for selectively venting the air space to the atmosphere when the internal combustion engine is running and for precluding evaporation of fuel from the air space into the atmosphere when the engine is not running. A fuel tank is also provided, the fuel tank being adapted to contain liquid fuel and adapted to have an air space above the liquid fuel. Means are included for selectively venting the fuel tank to the atmosphere when the internal combustion engine is running and for precluding evaporation of fuel from the fuel tank when the engine is not running. A conduit is provided between the fuel tank and the float bowl for conveying liquid fuel from the fuel tank to the float bowl.

The invention also includes an internal combustion engine having a fuel tank adapted to contain a quantity of liquid fuel and adapted to have a confined air space above the liquid fuel, and the fuel tank including means for selectively venting the fuel tank to the atmosphere, the means for selectively venting including means for venting the air space to the atmosphere when the internal combustion engine is running and for precluding evaporation of fuel from the fuel tank into the atmosphere when the engine is not running.

In the preferred embodiment of the invention the means for selectively venting the float bowl to the atmosphere includes a vent passage between the air space and the atmosphere, the vent passage including a valve seat. A valve member rests on the valve seat, and the valve member is supported on the valve seat so as to be freely movable with respect to the valve seat in response to vibration of the engine.

In a preferred embodiment of the invention a housing surrounds the valve seat and the valve member and supports the valve member so as to be freely movable with respect to the valve seat.

In one preferred form of the invention the valve member comprises a ball.

Various other features and advantages of the invention will be apparent by reference to the following description of a preferred embodiment, to the claims and the drawings.

Figure 1:
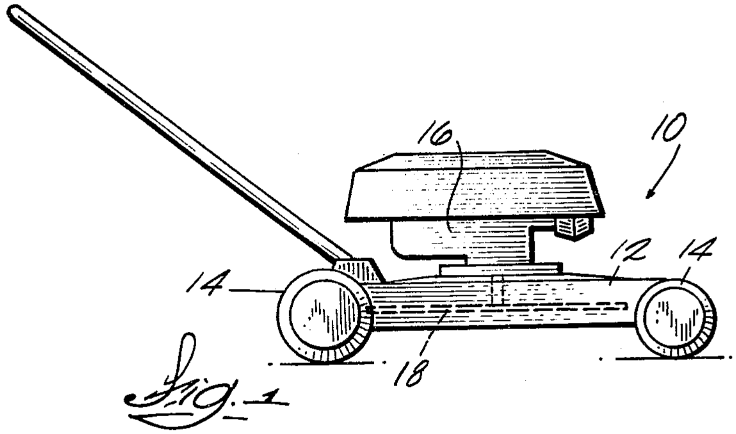
FIG. 1 is a perspective view of a lawn mower embodying the present invention.

Before explaining the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a lawn mower 10 embodying the invention and including a blade housing 12 supported for movement along the ground by wheels 14. The blade housing 12 supports an internal combustion engine 16 connected to a rotary cutting blade 18 for rotatably driving the rotary cutting blade. The internal combustion engine 16 includes a carburetor 20 such as that illustrated in FIG. 2, and a fuel tank 22 adapted to supply liquid fuel to the float bowl 24 of the carburetor 20 through a conduit 26.

Referring more particularly to the carburetor 20 of the internal combustion engine 16, the float bowl 24 is adapted to contain a quantity of liquid fuel and adapted to have an air space 28 above the liquid fuel. Liquid fuel is supplied to the float bowl 24 through the conduit 26 and through a fuel passage 30 in the carburetor body 32. The level of fuel in the float bowl 24 is controlled by a float 36. The float 36 is connected by an arm 38 to a pivot pin 40 and fuel flowing into the float bowl flows through a valve seat 42 which is controlled by a valve member 44 having an upper end engageable with the valve seat 42 and a lower end supported on the arm 38.

The carburetor 20 also includes a fuel mixture passage 48 communicating with the engine cylinder or cylinders (not shown). Liquid fuel is conveyed from the float bowl 24 to the fuel mixture passage 48 through a nozzle 50 which extends from the float bowl upwardly and which projects into the fuel mixture passage 48.

Means are also provided for selectively venting the air space 28 of the float bowl 24 to the atmosphere in order to facilitate flow of the liquid fuel from the float bowl 24 to the fuel air mixture passage 48 during operation of the engine 16, and to facilitate escape of gases from the air space 28 in response to possible expansion of the air in the fuel bowl in the event the float bowl 24 becomes heated, the means for venting also preventing evaporation of fuel or volatile components of the fuel from the float bowl when the engine is not running. In the illustrated construction, this means comprises a vent passage 56 located in the upper wall 58 of the fuel bowl 24 and providing for air flow between the air space 28 of the fuel bowl and the atmosphere.

Figure 3:
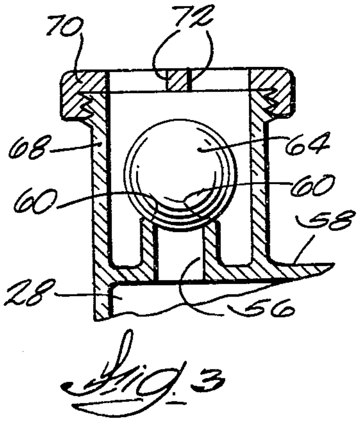
FIG. 3 is an enlarged view of a valve assembly illustrated in FIG. 2.

Means are provided in the upper end of the vent passage 56 for defining a valve seat 60 (FIG. 3). The means for venting the fuel bowl 24 also includes means defining a valve member 64 engageable with the valve seat 60. In the illustrated construction the valve member 64 is comprised of a ball adapted to engage the valve seat 60 to close the vent passage 56, the ball 64 also being supported so as to be freely movable with respect to the valve seal 60 and biased into engagement with the valve seat 60 by its own weight. In the illustrated construction the means for venting also includes a housing 68 for surrounding the ball 64 to control movement of the ball with respect to the valve seat 60 and to support the ball 64 such that the weight of the ball will tend to cause it to move to a position wherein it will engage the valve seat 60 but wherein the ball 64 is freely movable away from the valve seat in response to vibration of the engine 16 or in response to excessive pressure build up in the air space 28 of the float bowl 24. In the illustrated arrangement the venting means also includes a cap 70 threaded onto the upper end of the housing 68 and adapted to restrain the ball 64 in the housing. The cap 70 includes a pair of vent passages 72 to permit air flow from the housing 68 into the atmosphere.

While in the illustrated construction the valve member 64 is comprised of a ball, in other arrangements the valve member can have other configurations provided that the valve member 64 and the housing 68 surrounding the valve member 64 provide for a relatively free movement of the valve member with respect to the valve seat 60 and such that the weight of the valve member 64 will tend to cause the valve member 64 to move into engagement with the valve seat 60 to close the vent passage 56.

Since the valve member 64 is supported such that it is freely movable on the valve seat 60, when the engine 16 is running, the engine vibration will cause vibration of the valve member 64 with respect to the valve seat 60 and will thereby permit air flow through the vent passage 56 to vent the air space 28 of the float bowl to the atmosphere. When the engine is turned off and the vibration ceases, the weight of the valve member 64 will cause it to move back into engagement with the valve seat 60 thereby sealing the vent passage 56 and preventing evaporation of fuel from the float bowl 24.

One of the principal advantages of the construction described is that the vent assembly includes a relatively uncomplicated and inexpensive structure which can be conveniently incorporated in the carburetor float bowl. Additionally, while the vent assembly provides means for venting the float bowl during operation of the engine or in the event of an increase in the gas pressure in the float bowl, it also includes effective means to seal the float bowl against evaporation of the volatile components of the fuel when the engine is not operating. If the liquid fuel in the float bowl is not confined, and the volatile components of the fuel are free to evaporate into the atmosphere, the remaining fuel becomes less volatile and starting of the engine is more difficult. This evaporation of volatile components from the fuel can be a problem particularly in those engines where fuel and lubricant are mixed. In those applications, the evaporation of the lighter fractions of fuel make the remaining fuel rich in lubricant and the engine becomes difficult to start. The present invention provides means for conveniently preventing the evaporation of the fuel in the carburetor float bowl accordingly improving the starting of the internal combustion engine.

Figure 2:
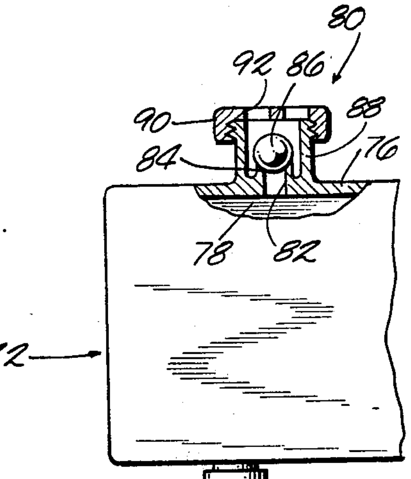
FIG. 2 is an enlarged cross section view of portions of the lawn mower shown in FIG. 1.
Figure 2:
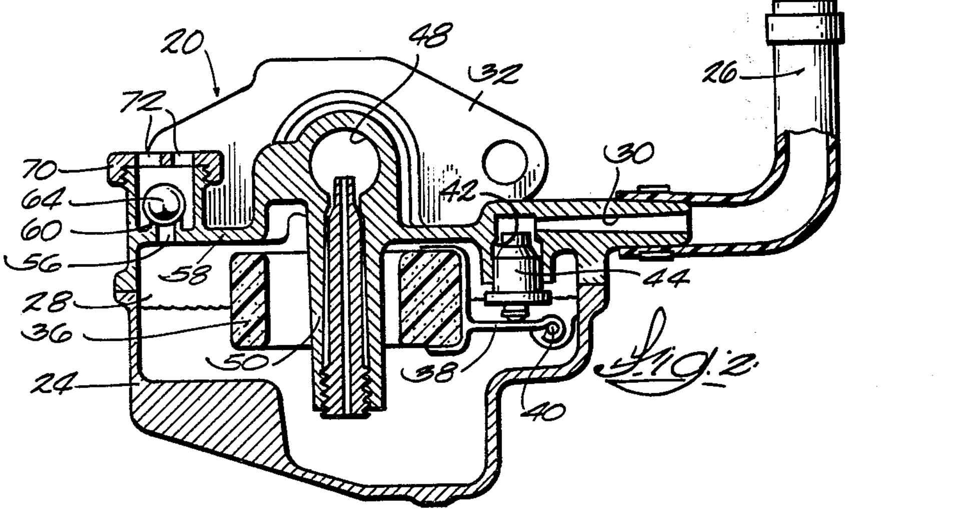

Referring again to FIG. 2, means are also illustrated for selectively venting the fuel tank 22 to the atmosphere in order to provide for uniform flow of the liquid fuel from the fuel tank 22 during operation of the engine 16 and to facilitate escape of gases from the fuel tank in response to expansion of the air in the fuel tank. The means for venting the fuel tank 22 also provides means for preventing the evaporation of the fuel from the fuel tank when the engine 16 is not running. While the means for selectively venting the fuel tank 22 could be formed as an integral portion of the fuel tank cap or could be located elsewhere than as illustrated in FIG. 2, in the illustrated arrangement the means for selectively venting includes means for defining an air passage through the upper wall 76 of the fuel tank and for providing for air flow between the air chamber portion 78 of the fuel tank 22 and the atmosphere in order to prevent formation of a vacuum in the fuel tank as fuel flows into the carburetor float bowl 24. In the illustrated construction, this means for venting the fuel tank comprises a vent assembly 80 of the type described above as venting the carburetor float bowl 24, the vent assembly 80 including a vent passage 82 located in the upper wall 76 of the fuel tank 22 and providing for air flow between the air space 78 of the fuel tank and the atmosphere. The vent passage 82 also includes means for defining a valve seat 84 and a valve member 86 adapted to rest on the valve seat 84 and to close the vent passage 82. Although the valve member 86 can have various constructions, in the illustrated arrangement it comprises a ball 84.

In the illustrated construction, the vent assembly 80 also includes a housing 88 surrounding the valve member 86 and for supporting the valve member 86 such that it is freely movable away from the valve seat 84 to provide for air flow through the vent passage 82 but also supporting the valve member 86 such that its weight tends to cause it to move into engagement with the valve seat 84. While the housing 88 can have various constructions, in the illustrated arrangement it includes a cylindrical wall surrounding the valve seat 84 and the valve member 86, the cylindrical housing 88 having an inside diameter larger than that of the ball 86 and supporting the ball such that it is freely movable toward and away from the valve seat and such that the weight of the ball will tend to cause the ball to move to a position where it will engage the valve seat 84. The housing 88 also includes a cap 90 having vent passages 92 providing for air flow between the housing 88 and the atmosphere. As with the valve member 64, while the valve member 86 is illustrated as comprising a ball, in other arrangements it could have other configurations provided that it provides a surface adapted to engage the valve seat 84 to close the vent passage 82 and provided that it has a shape which facilitates movement with respect to the valve seat in response to engine vibration.

As with the valve member 64, the valve member 86 is supported such that it is freely movable with respect to the valve seat 84 in response to vibration of the engine 16 to thereby provide for venting of the fuel tank. When the engine 16 is shut off, the valve member 86 moves back into engagement with the valve seat 84 thereby sealing the vent passage 82 and preventing evaporation of fuel into the atmosphere. The valve assembly 80 also permits the escape of gas from the fuel tank in the event that the gas in the fuel tank is heated excessively and caused to expand.

While the carburetor and fuel tank referred to above are employed on an engine used in connection with a lawn mower, it should be understood that they could be employed with internal combustion engines used in a variety of other applications.

Figure 4:
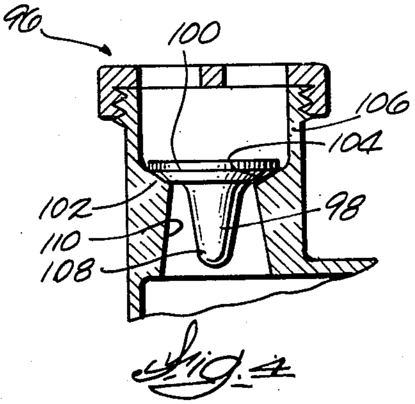
FIG. 4 is a view of an alternative embodiment of the valve assembly illustrated in FIG. 2.

FIG. 4 illustrates an alternative embodiment of the valve assembly illustrated in FIG. 3. More particularly, in the embodiment of FIG. 4, the valve assembly 96 includes a valve member 98 having a disc portion 100 with a lower peripheral edge 102 adapted to be supported on a valve seat 104 defined by a surface of a cylindrical housing 106. The valve member 98 also includes a stem 108 extending downwardly from the center of the disc 100 and adapted to be housed in the vent passage 110. The downwardly extending stem 108 functions as a means for maintaining the proper relative position of the disc 100 on the valve seat 104. Like the valve member 64, the valve member 98 closes the vent passage 110 when the engine is not running and thereby prevents evaporization of fuel through the vent passage. On the other hand, the valve member 98 is supported so as to be freely movable with respect to the valve seat 104 in response to vibration of the engine to thereby provide for venting the fuel bowl or the like fuel chamber to the atmosphere.

Various features of the invention are set forth in the following claims.

I claim:

1. A lawn mower including a blade housing, a wheel for supporting the blade housing for movement along the ground, a rotatable cutting blade supported in the blade housing, and an internal combustion engine for rotatably driving said cutting blade, the internal combustion engine including a carburetor having a float bowl adapted to contain a quantity of liquid fuel and adapted to have a contained air space above the liquid fuel, and means for selectively venting said float bowl to the atmosphere, said means for selectively venting including means for venting the air space to the atmosphere in response to engine vibration when said internal combustion engine is running and for precluding evaporation of fuel from the float bowl into the atmosphere when said engine is not running.

2. A lawn mower as set forth in claim 1 wherein said means for selectively venting said float bowl to the atmosphere includes a vent passage between said air space and the atmosphere, said vent passage including a valve seat, a valve member resting on said valve seat, said valve member being supported on said valve seat so as to be freely movable with respect to said valve seat in response to vibration of said engine.

3. A lawn mower as set forth in claim 2, and further including a housing surrounding said valve seat and said valve member and supporting said valve member so as to be freely movable with respect to said valve seat.

4. A lawn mower as set forth in claim 2, wherein said valve member comprises a ball.

5. A lawn mower including a blade housing, a wheel for supporting the blade housing for movement along the ground, a rotatable cutting blade supported in the blade housing, and an internal combustion engine for rotatably driving said cutting blade, the internal combustion engine including a carburetor having a float bowl adapted to contain a quantity of liquid fuel and adapted to have an air space above the liquid fuel, means for selectively venting said air space to the atmosphere in response to engine vibration when said internal combustion engine is running and for precluding evaporation of fuel from said air space into the atmosphere when said engine is not running, a fuel tank adapted to contain liquid fuel and adapted to have an air space above the liquid fuel, means for selectively venting the fuel tank to the atmosphere when said internal combustion is running and for precluding evaporation of fuel from the fuel tank into the atmosphere when said engine is not running, and a conduit between said fuel tank and said float bowl for conveying liquid fuel from the fuel tank to the float bowl.

6. A lawn mower as set forth in claim 5 wherein said means for selectively venting said float bowl to the atmosphere includes a vent passage between said float bowl air space and the atmosphere, said vent passage including a valve seat, a valve member resting on said valve seat and being supported on said valve seat so as to be freely movable with respect to said valve seat in response to vibration of said engine, and wherein said means for selectively venting said fuel tank includes a fuel tank vent passage between said fuel tank air space and the atmosphere, said fuel tank vent passage including a valve seat, a valve member resting on said valve seat of said fuel tank vent passage, and said fuel tank valve member being supported on said valve seat of said fuel tank vent passage so as to be freely movable with respect to said fuel tank valve seat in response to vibration of said engine.

7. A lawn mower as set forth in claim 6 and further including a housing surrounding said float bowl valve seat and said float bowl valve member and supporting said float bowl valve member so as to be freely movable with respect to said float bowl valve seat, and a second housing surrounding said fuel tank valve seat and said fuel tank valve member and supporting said fuel tank valve member so as to be freely movable with respect to said fuel tank valve seat.

8. A lawn mower including a blade housing, a wheel for supporting the blade housing for movement along the ground, a rotatable cutting blade supported in the blade housing, an internal combustion engine for rotatably driving the cutting blade, and a fuel tank adapted to contain a quantity of liquid fuel and adapted to have a confined air space above the liquid fuel, and said fuel tank including means for selectively venting said fuel tank to the atmosphere, said means for selectively venting including means for venting the air space to the atmosphere in response to engine vibration when said internal combustion engine is running and for precluding evaporation of fuel from the fuel tank into the atmosphere when said engine is not running.

9. A lawn mower as set forth in claim 8 wherein said means for selectively venting said float bowl to the atmosphere includes a vent passage between said air space and the atmosphere, said vent passage including a valve seat, a valve member resting on said valve seat, said valve member being supported on said valve seat so as to be freely movable with respect to said valve seat in response to vibration of said engine.

10. A lawn mower as set forth in claim 9, and further including a housing surrounding said valve seat and said valve member and supporting said valve member so as to be freely movable with respect to said valve seat.

11. A lawn mower as set forth in claim 9, wherein said valve member comprises a ball.

* * * * *

UNITED STATES PATENT AND TRADEMARK OFFICE

CERTIFICATE OF CORRECTION

PATENT NO. : 4,416,108

DATED : November 22, 1983

INVENTOR(S) : Burzoe K. Ghandhi

It is certified that error appears in the above-identified patent and that said Letters Patent are hereby corrected as shown below:

Column 6, line 33, "contained" should be -- confined --.

Column 7, line 2, after "atmosphere", insert -- in response to engine vibration --.

Signed and Sealed this

*Thirtieth* Day of *July 1985*

[SEAL]

*Attest:*

DONALD J. QUIGG

*Attesting Officer* *Acting Commissioner of Patents and Trademarks*